No. 11,943. Reissued Nov. 12, 1901.

W. HOSSFELD.

TRUNK.

(Application filed Feb. 9, 1901.)

Witnesses:
Edward Reed
L. B. Middleton

Inventor:
William Hossfeld.
By Ellis Spear
Atty.

THE NORRIS PETERS CO., PHOTO-LITHO., WASHINGTON, D. C.

UNITED STATES PATENT OFFICE.

WILLIAM HOSSFELD, OF WICHITA, KANSAS.

TRUNK.

SPECIFICATION forming part of Reissued Letters Patent No. 11,943, dated November 12, 1901.

Original No. 621,086, dated March 14, 1899. Application for reissue filed February 9, 1901. Serial No. 46,720.

*To all whom it may concern:*

Be it known that I, WILLIAM HOSSFELD, a citizen of the United States of America, residing at Wichita, in the county of Sedgwick and State of Kansas, have invented certain new and useful Improvements in Trunks, of which the following is a specification, reference being had therein to the accompanying drawings and the figures of reference thereon, forming a part of this specification, in which—

Figure 1:
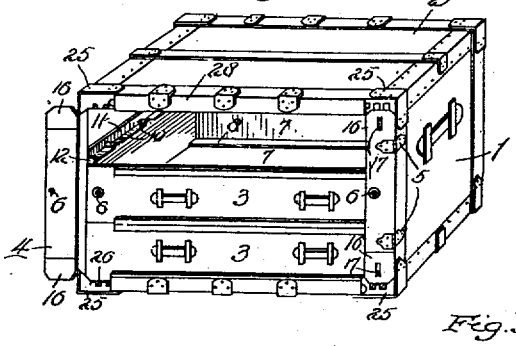
Figure 2:
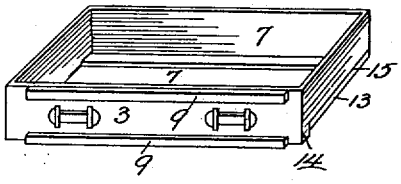
Figure 3:
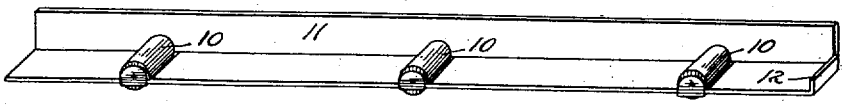
Figure 4:
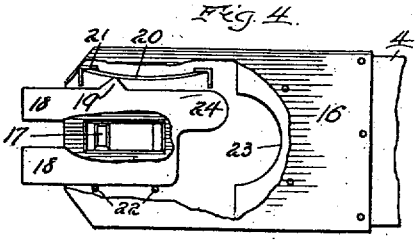
Figure 5:
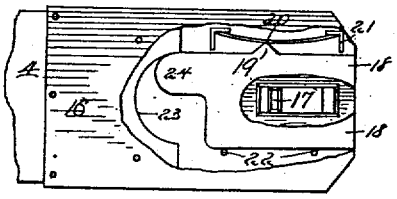
Figure 6:
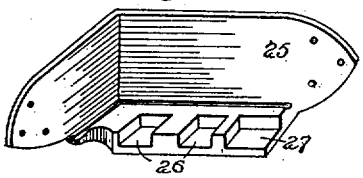
Figure 7:
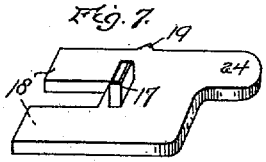

Figure 1 is a perspective view of my improved trunk. Fig. 2 is a perspective view of one of the drawers. Fig. 3 is a perspective view of the drawer rollers and frame. Figs. 4 and 5 are detail views of the locking device. Fig. 6 is a perspective view of one of the corner-clamps. Fig. 7 is a detail perspective of the lock.

This invention relates to certain improvements in trunks; and it consists in the construction and arrangement of its parts; and the object of my invention is to produce a trunk suitable for home use or traveling, convenient and durable.

Referring to the drawings, 1 represents a trunk. 2 represents a solid top to said trunk. 3 represents drawers in said trunk. 4 represents locking-slats hinged at 5 to the front of said trunk 1. 6 represents a lock in the center of said slat 5 and the center drawer 3. 7 represents a fiber bottom and rear end of said drawers. 8 represents a strengthening-slat along the bottom from side to side of the rear end of said drawers. 9 represents a strengthening-slat on the top and bottom of the front of said drawers on the outside, the ends of which are flush with the locking-slats 4 when said slats are closed.

10 represents rollers in frame 11. Said frame is secured to the inside of each end of said trunk 1 below each drawer by means of screws or nails. 12 represents said frame 11 turned up at the forward end.

13 represents the bottom of the ends of the drawers 3 cut away to slide on the rollers 10. 14 represents the bottom of the front of said drawers 3, projecting below the ends so the top and bottom of said drawers will meet when closed, as shown in Fig. 1. Said portion 14 is adapted to strike said ends 12 when the drawers are closed.

15 represents the fiber bottom turned upon the outside of the ends of the drawers and secured thereto.

16 represents locks at each end of the locking-slats 4.

17 represents a lug, as shown in Fig. 7, for moving the locking-bolts 18 out and in.

19 represents a lug on the side of the locking-bolts 18, which presses against the spring 20, which is held in place by the lugs 21, which are integral with plate 16. 22 represents lugs on the opposite side of the spring 20 for holding said bolts 18 in place.

23 represents the end of the wooden locking-strip 4, bored out to receive the end 24 of the bolts 18.

25 represents corner-clamps for securing the front corners at the top and bottom, also forming a part of the locks 16, which are secured to the ends of the slats 4. 26 represents said corner-clamps provided with mortises to receive the bolts 18. 27 represents a mortise in said corner-clamps 25 to receive the ends of the strengthening-slats 28.

This trunk is made with the top, bottom, back, and ends solid, with a fiber covering, with suitable slats and clamps. The front is open, with the strengthening-slats 28 at the top and bottom and the hinged locking-strips 4 at each end. A series of drawers is placed in said trunk with their fronts 3 forming the front of the trunk when closed. The locks 16 on each end of the two locking-strips 4 hold said drawers closed. The drawers are easily pulled out on said rollers 10, and being made with fiber bottom 7 and back 7 they are very light.

Having thus described my invention, what I claim as new and useful, and desire to secure by Letters Patent, is as follows:

1. In a bureau-trunk, a body having an open front, a plurality of drawers slidably mounted in said body portion and forming when closed the complete front of the trunk, strips hinged to the ends of said trunk to fold over against the ends of the faces of the drawers, and locking members carried by one of the drawers engaging corresponding locking members carried by said strips, substantially as described.

2. In a bureau-trunk, a body having a solid top bottom, ends and back and an open front, a plurality of drawers slidably carried by said body, the fronts of the drawers forming the front of the trunk when closed, vertical strips hinged to the ends, locks on the ends of the strips, corner-clamps forming the keepers of said locks, and independent locking members on the central portions of said strips coöperating with locking members on one of the drawers, substantially as described.

3. In a trunk, a body having a solid top, bottom, ends and back, and an open front, a plurality of drawers slidably carried by said body, the fronts of said drawers forming the front of the trunk when closed, strips hinged to said ends locks on the ends of said strips having sliding bolts, and rigid corner-clamps having recesses to receive said sliding bolts, substantially as described.

4. In a bureau-trunk, a body having a solid top, bottom, ends and back and an open front, a plurality of drawers slidably mounted therein, vertical strips hinged to the ends of the trunk and overlapping the ends of the drawers when closed, lock-casings on the ends of said strips, sliding bolts in said casings, a projection from one side of each locking-bolt, a spring having a curved portion bearing against said projection, and rigid corner-clamps on the corners of the trunk having recesses to receive the bolts, substantially as described.

5. A trunk having an open front and solid top, ends, back and bottom, frames angular in cross-section having rollers journaled in the frames with their axes parallel to the horizontal portions and the vertical portions secured to the inner face of the trunk, and drawers supported by and running on said rollers, the fronts of the drawers forming the front of the trunk, substantially as described.

WILLIAM HOSSFELD.

Witnesses:

HENRY W. HUTTMANN,

A. C. SICUISON.